(12) United States Patent
Abeysinghe et al.

(10) Patent No.: US 11,891,941 B2
(45) Date of Patent: Feb. 6, 2024

(54) FLUID FLOW MANAGEMENT IN VEHICLES

(71) Applicant: Honda Motor Co., Ltd., Tokyo (JP)

(72) Inventors: Pubudu C. Abeysinghe, Marysville, OH (US); Pirooz Moradnia, Dublin, OH (US); Kevin D. Barcomb, Powell, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 30 days.

(21) Appl. No.: 17/690,560

(22) Filed: Mar. 9, 2022

(65) Prior Publication Data

US 2023/0287827 A1 Sep. 14, 2023

(51) Int. Cl.
| | | |
|---|---|---|
| *F01P 11/10* | (2006.01) | |
| *B01D 46/10* | (2006.01) | |
| *F01P 11/12* | (2006.01) | |

(52) U.S. Cl.
CPC .............. *F01P 11/10* (2013.01); *B01D 46/10* (2013.01); *F01P 11/12* (2013.01); *B01D 2279/60* (2013.01)

(58) Field of Classification Search
CPC .......... B62D 25/081; B60H 1/28; B60H 1/30; F01P 11/10; F01P 5/06
See application file for complete search history.

(56) References Cited

U.S. PATENT DOCUMENTS

| | | | | |
|---|---|---|---|---|
| 4,249,626 A | * | 2/1981 | Fields ................. | F28D 1/05383 165/47 |
| 4,646,864 A | * | 3/1987 | Racchi ................. | B62D 25/105 181/204 |
| 4,819,550 A | | 4/1989 | Ioka | |
| 5,139,458 A | | 8/1992 | Koukal et al. | |
| 5,277,656 A | * | 1/1994 | Koukal ..................... | B60H 1/28 454/147 |
| 5,950,753 A | * | 9/1999 | Muldoon ............... | B60K 11/00 180/69.2 |
| 8,479,853 B2 | | 7/2013 | Verbrugge | |
| 9,545,844 B2 | | 1/2017 | Forty et al. | |
| 9,776,579 B1 | | 10/2017 | Delaney et al. | |
| 10,215,120 B2 | | 2/2019 | Titus et al. | |
| 2006/0266309 A1 | * | 11/2006 | Lang ........................ | F01P 11/10 123/41.7 |
| 2014/0299076 A1 | | 10/2014 | Tamakoshi | |

FOREIGN PATENT DOCUMENTS

| | | | | |
|---|---|---|---|---|
| CN | 213948582 U | | 8/2021 | |
| DE | 4303663 C1 | | 3/1994 | |
| DE | 4322951 C1 | | 8/1994 | |
| DE | 102014006597 A1 | * | 11/2015 | ............. B60K 11/02 |
| DE | 102016010125 A1 | | 2/2018 | |
| JP | S6078620 U | * | 6/1985 | |

(Continued)

*Primary Examiner* — Hung Q Nguyen

(74) *Attorney, Agent, or Firm* — Plumsea Law Group, LLC

(57) ABSTRACT

Systems and methods for water management in a vehicle using a fluid management assembly are disclosed. The fluid management assembly includes a housing in fluid communication at one end with a vent in the hood of the vehicle and at a second end with a radiator of the vehicle. Air flow from the radiator is directed to the vent, and water and other liquids entering the vent are diverted away from the radiator via a drainage spout extending from a bottom side of the fluid duct assembly.

20 Claims, 10 Drawing Sheets

(56) References Cited

FOREIGN PATENT DOCUMENTS

| | | | |
|---|---|---|---|
| JP | H0512368 U * | 2/1993 | |
| JP | 3077831 B2 * | 8/2000 | |
| JP | 3422386 B2 * | 6/2003 | |
| JP | 2005067569 A * | 3/2005 | |
| JP | 2010215113 A * | 9/2010 | |
| KR | 19980022509 U | 7/1998 | |
| KR | 10-1997-0039041 | 7/1999 | |
| KR | 101592555 B1 | 2/2016 | |
| KR | 20210081531 A | 7/2021 | |
| WO | WO-2017037251 A1 * | 3/2017 | ............. B60K 11/04 |

* cited by examiner

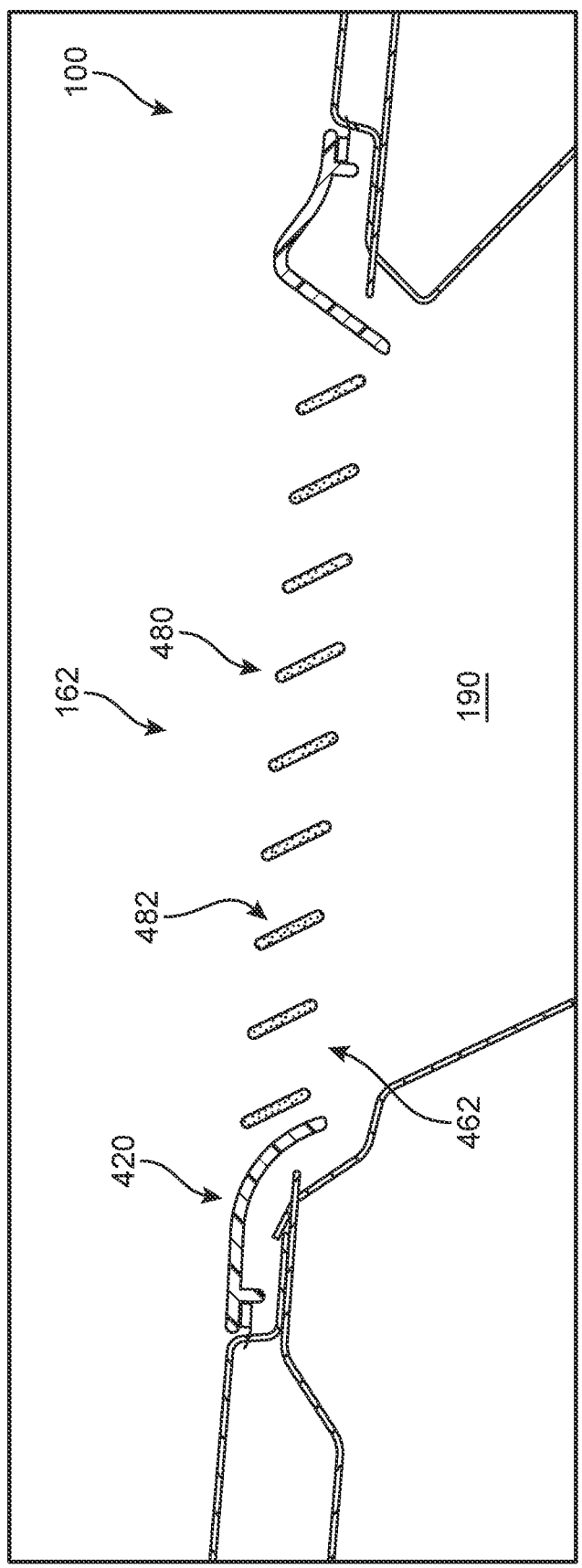

FLUID FLOW MANAGEMENT IN VEHICLES

BACKGROUND

The present disclosure generally relates to vehicle structures and systems for manipulating air flow through a vehicle, and methods of use and manufacture thereof. More particularly, the disclosed subject matter relates to method of water management within a vehicle air duct and a system for water management within a vehicle air duct.

Some types of vehicles incorporate vents in the hood to allow air from the radiator and its associated hot engine compartment to flow into the ambient environment outside the vehicle. However, the vents formed on an exterior surface of the hood, being designed to provide a path for air flow, also leave the compartment vulnerable to the ingress of water originating from rain, melting ice and snow, car wash water, or even condensation. Water and other fluids or particles entering an engine compartment must be managed or diverted in order to prevent flow onto or into engine compartment components not designed to accept water.

There is a need in the art for a hood water management system that prevents the ingress of water into the engine compartment without interrupting air flowing out of the radiator fans.

SUMMARY

The disclosed embodiments provide methods and systems for water management in a vehicle air duct.

In one aspect, a fluid management system for a vehicle includes a fluid guide duct that further includes an elongated housing extending from a first end to a second end, an interior channel extending from a first opening at the first end to a second opening at the second end, the first opening being in fluid communication with a vent formed in a hood of the vehicle, and the second opening being disposed lower than the first opening, and a drainage spout extending from a slot formed in a bottom side of the housing, the drainage spout including a flume portion serving as a conduit for directing fluid flow in a diagonally downward direction from the interior channel.

Another aspect provides a fluid management assembly for a motor vehicle having a hood and cooling system component. In some embodiments, the fluid guide assembly includes a pipe housing including a first opening in fluid communication with a vent formed in the hood and a second opening in fluid communication with the cooling system component, and a drainage spout protruding from a bottom side of the housing.

Another aspect provides a method of guiding fluid flow through a front end compartment of a motor vehicle via a fluid guide duct including a first opening and a second opening. In some embodiments, the method includes steps of discharging air flow from a cooling system component into the second opening of the fluid guide duct, directing the air flow from the second opening to the first opening of the fluid guide duct, the first opening being in fluid communication with a vent formed in a hood of the motor vehicle, receiving water flow from the vent into the first opening of the fluid guide duct, directing the water flow along an interior surface of a bottom side of the fluid guide duct, and discharging the water flow through a slot formed in the bottom surface of the fluid guide duct.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The embodiments can be better understood with reference to the following drawings and description. The components in the figures are not necessarily to scale, emphasis instead being placed upon illustrating the principles of the embodiments. Moreover, in the figures, like reference numerals designate corresponding parts throughout the different views.

FIG. 4B is a schematic cross-sectional view of the first opening for the fluid guide duct housing further including a plurality of louvers mounted across the first opening, according to an embodiment;

DETAILED DESCRIPTION

A water management system for a vehicle hood air duct assembly is disclosed. The air duct assembly includes a drainage outlet at a bottom surface of the duct for water drainage. The hood includes an air outlet (vent) from which the duct extends, and the drainage outlet is formed along a region of a lower surface of the duct. The drainage outlet is shaped and configured to maintain normal air flow from the radiator fans to the external environment. In some embodiments, louvers are employed in the vent cover to further mitigate undesirable ingress of fluid and other objects (i.e., leaves, animals, dirt, etc.).

Figure 1A:
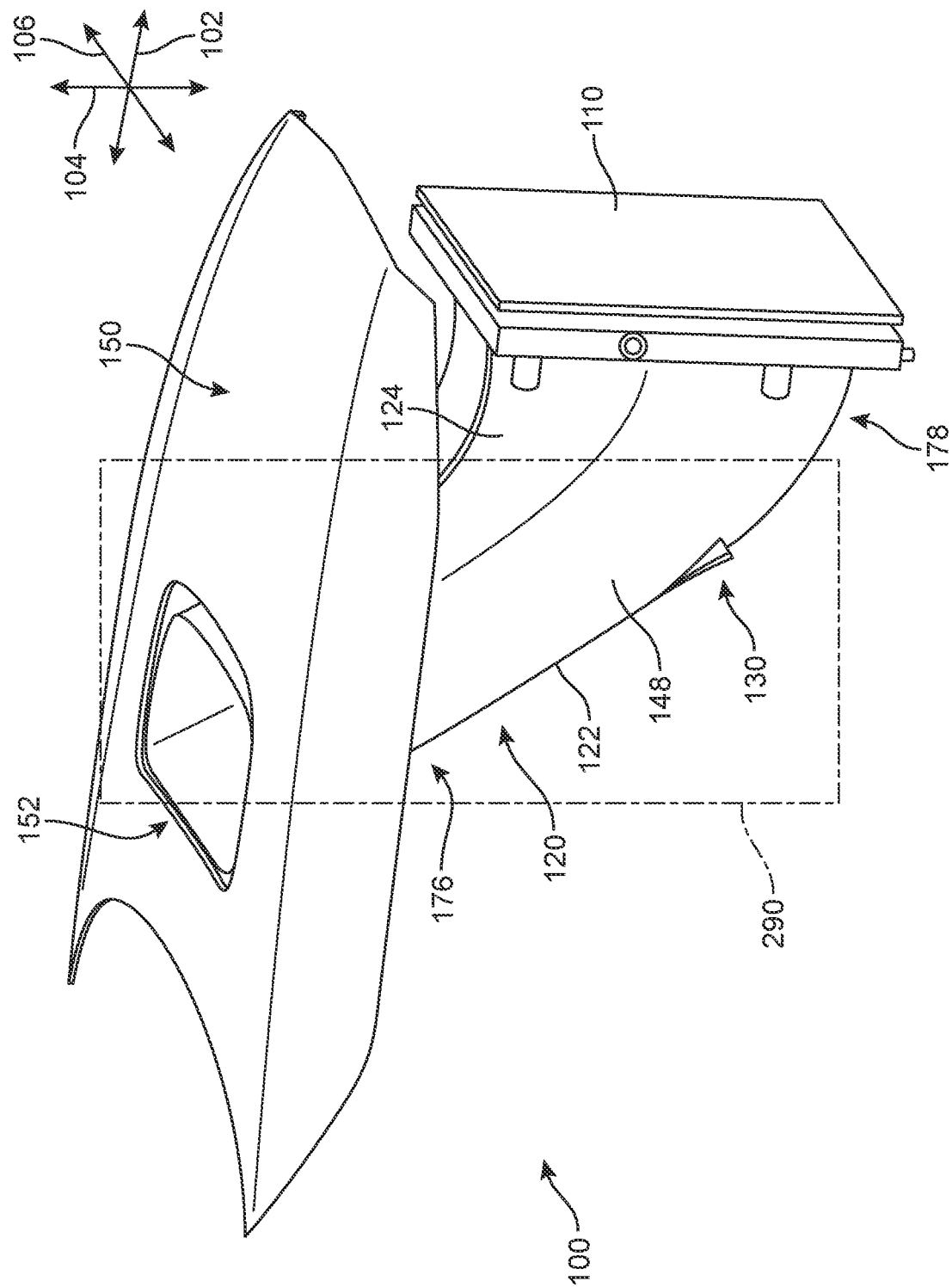
FIG. 1A depicts a perspective view of a fluid management assembly extending between a hood vent and a radiator, according to an embodiment.
Figure 1B:
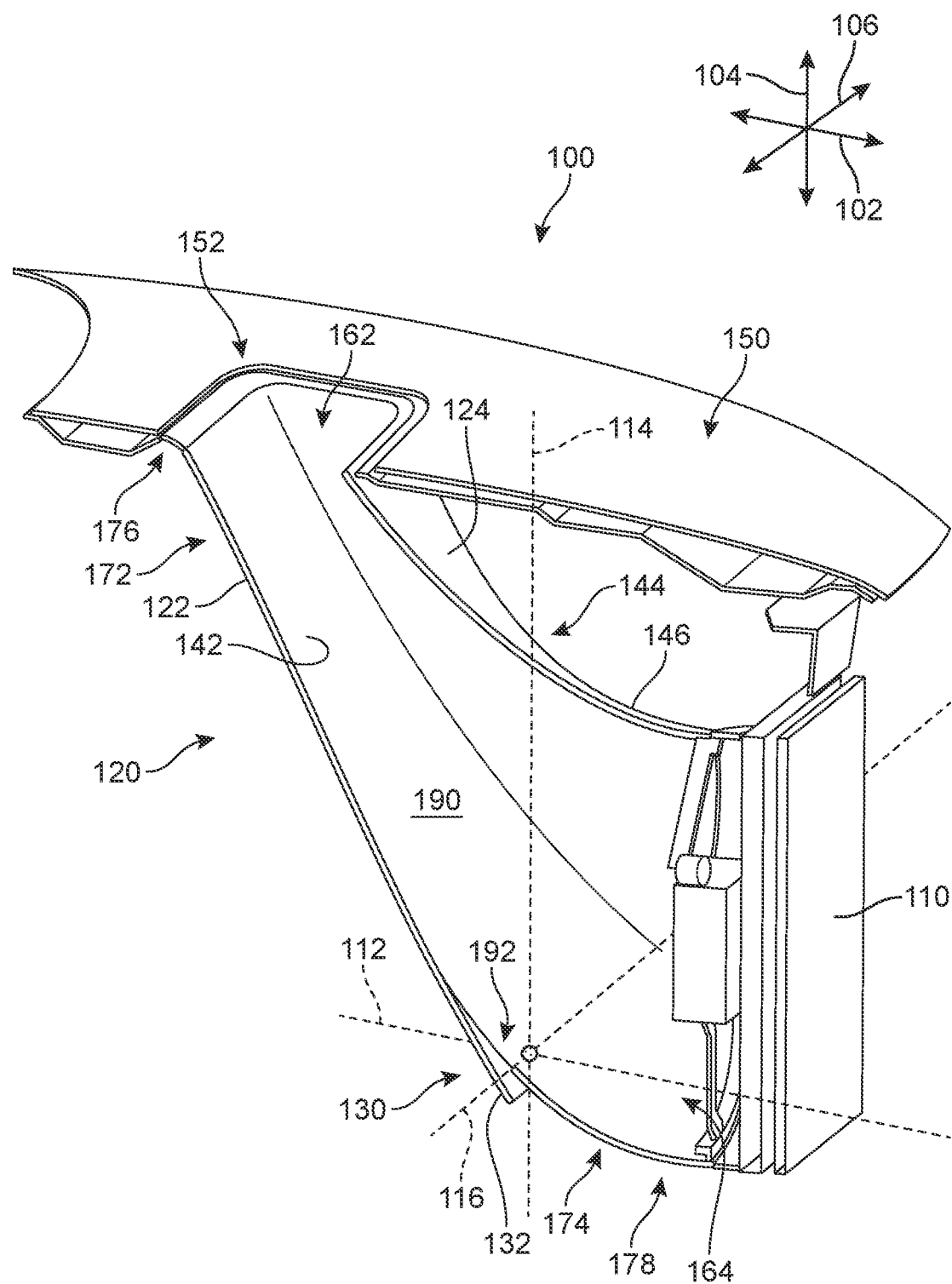
FIG. 1B depicts a cutaway view of the fluid management assembly of FIG. 1A, according to an embodiment.

A vehicle hood 150 with a fluid management assembly 100 in accordance with an exemplary embodiment of the disclosure herein is shown generally in FIGS. 1A and 1B. The fluid management assembly ("assembly") 100 includes a fluid guide duct comprising a duct housing ("housing") 120 that is, at a first end 176 (see cutaway view of FIG. 1B), in fluid communication with a hood vent 152 formed in the hood and leading to an external environment of the vehicle. The duct housing 120 also includes an opposing second end 178 (see FIG. 1B) that is in fluid communication with a radiator assembly ("radiator") 110 of the vehicle. It can be appreciated that radiator 110, when in operation, is configured to discharge air in a direction from the radiator 110 into the second end 178 of the duct housing 120 and out through the first end 176 of the duct housing 120.

For clarity, the description makes reference to a set of axes. As a general matter, the term "longitudinal axis" as used throughout this detailed description and in the claims refers to an axis that extends in a longitudinal direction, which is a direction extending the length of a component. In the present case, the length of the hood 150 is generally aligned with a longitudinal axis 102, and the duct housing 120 extends from a first end to a second end (see FIG. 1B) in a direction generally aligned with longitudinal axis 102. Similarly, the term "lateral axis" as used throughout this detailed description and in the claims refers to an axis that extends in a lateral direction, which is a direction running a width of a component. In the present case, the width of the hood 150 is generally aligned with a lateral axis 106, and the distance between a first side and a second side of the duct housing (see FIG. 1B) extends in a direction generally aligned with lateral axis 106. In addition, the term "vertical axis" as used throughout this detailed description and in the claims refers to an axis that extends in a vertical direction, which is a direction running from the roof structure to the floor of a vehicle, and in this case a vertical axis 104 is aligned with a direction that extends from the upper surface of the hood 150 and through a portion of the duct housing 120, as well as a length of the radiator 110. Each axis of the three axes may be understood to be orthogonal relative to the other two axes.

Furthermore, the description makes reference to distal and proximal directions (or portions). As used herein, the distal direction is a direction outward or oriented away from the second end 178 of the duct housing 120 (or toward the hood vent 152). Also, the proximal direction is a direction oriented away from the first end 176 (or nearer to the radiator 110). Thus, a distal side or region refers to a portion of a component that is disposed closer to the hood vent 152 and further from the radiator 110, and a proximal side or region refers to a portion of a component that is disposed nearer to the radiator 110 and further from the hood vent 152.

In different embodiments, the assembly 100 can be understood to include a substantially tubular or pipe-shaped duct housing 120 that increases in surface area in the proximal direction, such that the size of the first opening 162 is smaller or narrower than the size of the second opening 164. In one embodiment, the pipe has a substantially rounded rectangular cross-sectional shape along the lateral axis 106. For purposes of reference, the assembly 100 will be described as having four sides, including a top sidewall ("top side") 124, an opposing bottom sidewall ("bottom side") 122, a first sidewall ("first side") 148 (shown in FIG. 1A), as well as a second sidewall ("second side") 146 opposite to the first side shown in the cutaway view of FIG. 1B. In addition, as shown in FIG. 1B, the duct housing 120 includes an exterior surface 144 that faces outward and an interior surface 142 that faces inward and defines an interior channel 190 substantially enclosed by the housing 120 and extends from first opening 162 in first end 176 to second opening 164 at second end 178.

Furthermore, assembly 100 also includes a spout portion ("spout") 130 protruding from its bottom side 122. As will be discussed in greater detail below, the spout 130 is configured to direct water and other liquid flow as it travels from the vent 152 downward along the interior surface 142 of the bottom side 122. The assembly 100 further includes a slotted-opening (or simply, "slot") 192 formed in the bottom side 122 of the housing 120. In some embodiments, the slot 192 has a substantially rectangular shape, though in other embodiments, the slot 192 may have different regular or irregular shapes. Thus, while there are two main openings (first opening 162 and second opening 164) associated with the assembly 100, the slot 192 serves as a third, minor opening in the assembly. It can be understood that the second opening 164 is designed to permit air flow from the radiator 110 to enter the channel 190, while first opening 162 is designed to permit air to flow out (exit the vehicle). However, in real-world conditions, water or other liquids can sometimes enter the channel 190 via the first opening 162. The spout 130 of the proposed system is thereby designed to direct flow of liquid out of the channel 190, and prevent the liquid from instead exiting through the second opening 164.

For purposes of reference, the assembly 100 can also be understood to comprise an upper portion 172 and a lower portion 174. The lower portion 174 represents the base of the pipe whose mouth (second opening 164) is aligned with the exit of air from the cooling system (e.g., radiator 110, fan, etc.) at one end. The opposite end of the lower portion 174 is depicted by a demarcation line 116 generally aligned with lateral axis 106. The demarcation line 116 is substantially aligned with the lowest edge of the slot 192. In addition, at its highest point, the upper portion 172 extends from the first opening 162 (at first end 176) down in a steep slope until reaching the lowest edge of the slot 192. Thus, the spout portion 130 extends from the bottom side 122 in the upper portion 172 of housing 120.

The spout 130 includes a flume portion 132 that extends from the bottom side 122 in a direction away and diagonally downward relative to the slot 192. In some embodiments, the flume portion 132 is integrally formed with the bottom side 122, while in other embodiments, the flume portion 132 is mechanically joined or connected along one edge of the slot 192. As water travels down the interior surface 142 along the bottom side 122 of the housing 120, it will move toward the slot 192, to be guided out of the compartment via the 'slide' provided by the flume portion 132. It should be appreciated that, in some embodiments, the slot 192 is substantially centered in the bottom side 122 (toward to a longitudinal midline 112 depicted by dotted line in FIG. 1B), being formed equidistantly from both the first side 148 and second side 146. In addition, in some embodiments, the first side 148 and second side 146 are each sloped inward toward a vertical midline 114. Such an arrangement maximizes the flow of water from the first opening 162 toward the slot 192 and ensures most, if not all, of the water that has entered will be routed into the spout 130 and pour down and out along flume portion 132.

Figure 2A:
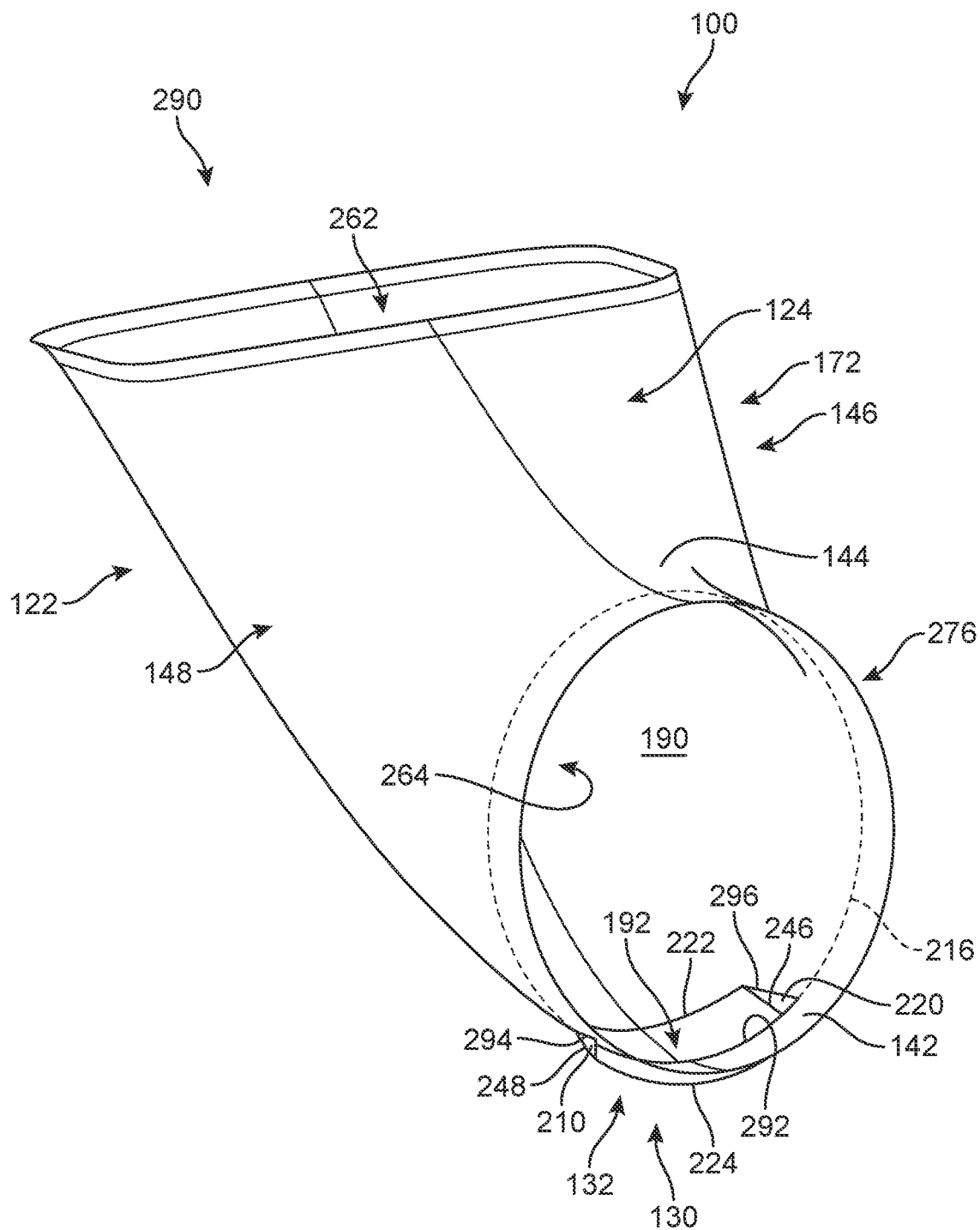
FIG. 2A is a schematic side view of a portion of a fluid guide duct housing, according to an embodiment.
Figure 2B:
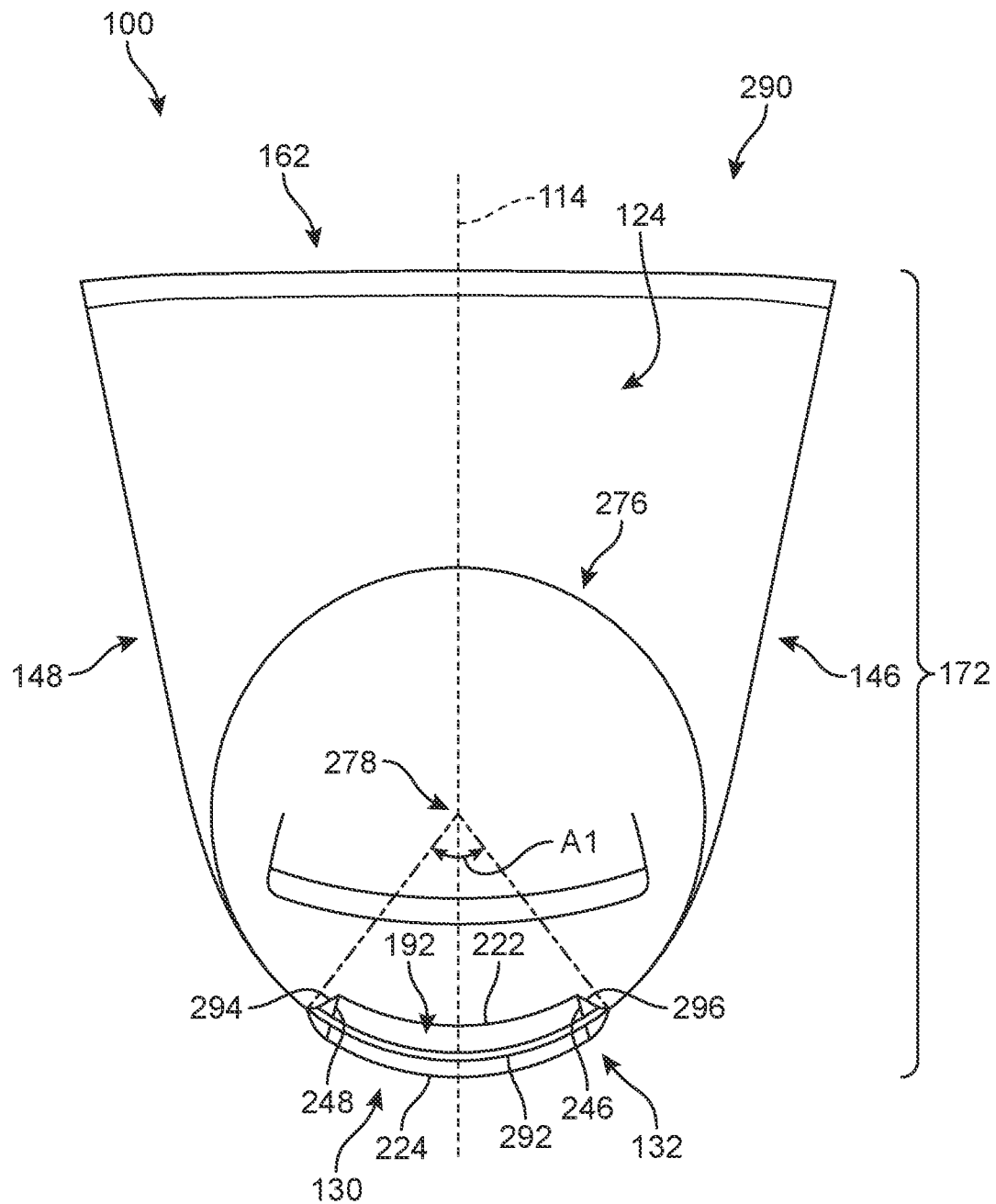
FIG. 2B is a schematic front view of a portion of a fluid guide duct housing, according to an embodiment.

For purposes of clarity, a section 290 of FIG. 1A is presented in isolation in FIGS. 2A and 2B. The section 290 primarily includes part of the upper portion 172 of the housing 120 with the attached spout 130, as well as a small sliver of the lower portion 174 directly adjacent to and proximal of a circular demarcation line 216, which is in the same plane as demarcation line 116, but runs around the pipe circumference aligned with a proximal border 292 of slot 192. As shown in this example, flume portion 132 includes four edges comprising a first edge 222, an opposing second edge 224, a third edge 248 (disposed closer to the second side 146), and an opposing fourth edge 246 (disposed to the first side 148), shown in dotted line. The first edge 222 in this case corresponds to the edge touching or abutting the exterior surface 144 of housing 120 along the distal border of the slot 192, before extending in a proximal direction, downward and away from the distal border of the slot 192, to the second edge 224, corresponding to the lowest portion of the assembly 100 and the outermost portion of the flume portion 132. In other embodiments, flume portion 132 can include other regular or irregular shapes, such as a tapered or triangular rather than a rectangular flume, or an oval or other shape. In one example, the flume portion 132 includes a dip or curvature towards its center, as depicted in FIG. 2B, in order to better collect and funnel liquid as it drains down.

It should be understood that the size and/or dimensions of the flume portion 132 need not match the size and/or dimensions of the slot 192. In one embodiment, the length of the flume portion 132 (i.e., in this case, corresponding to the length of either the third edge 248 or fourth edge 246) is substantially similar to the length of the slot 192 (i.e., in this case, corresponding to the length of a first side border 294 and/or second side border 296 of the slot 192). In other embodiments, the length of the flume portion 132 is longer than that of the slot 192, in order to provide additional routing to the flow of water exiting the duct. In some embodiments, the side borders and proximal border 292 (and/or distal border) are substantially orthogonal relative to one another, providing a generally bent or curved rectangular opening that is configured to maximize the effect on gravity bringing the water down into the slot and out the spout 130. Furthermore, while in some embodiments the side borders of the slot 192 and the side edges of the flume portion 132 can be disconnected (i.e., a gradually increasing gap occurs between them), in other embodiments, as shown in FIG. 2A, they may be connected or joined together by a wedge portion. For example, first wedge portion 210 extends between and bridges the first side border 294 and third edge 248, and second wedge portion 220 extends between and bridges the second side border 296 and fourth edge 246.

It can be further observed in FIGS. 2A and 2B that the structure of the upper portion 172 transitions from a curved rectangular pipe at its proximal end to a substantially tubular section at its distal end (where it joins the lower portion). With the front-view of FIG. 2B, it can be appreciated that in some embodiments, tubular section 276 has a substantially circular cross-sectional shape relative to the lateral axis and vertical axis. In different embodiments, the width of the slot 192 and/or spout 130 relative to the lateral axis corresponds to an arc portion of this circle. As shown in FIG. 2B, from a center point 278 of the circle, the arc is associated with an angle A1. Angle A1 will be less than 180 degrees, and, in order to minimize disruption to airflow in the direction of the hood vent, will typically be 90 degrees or less. In an exemplary embodiment, angle A1 is approximately 70-80 degrees to ensure maximum airflow in one direction and waterflow in the opposite direction.

Figure 3:
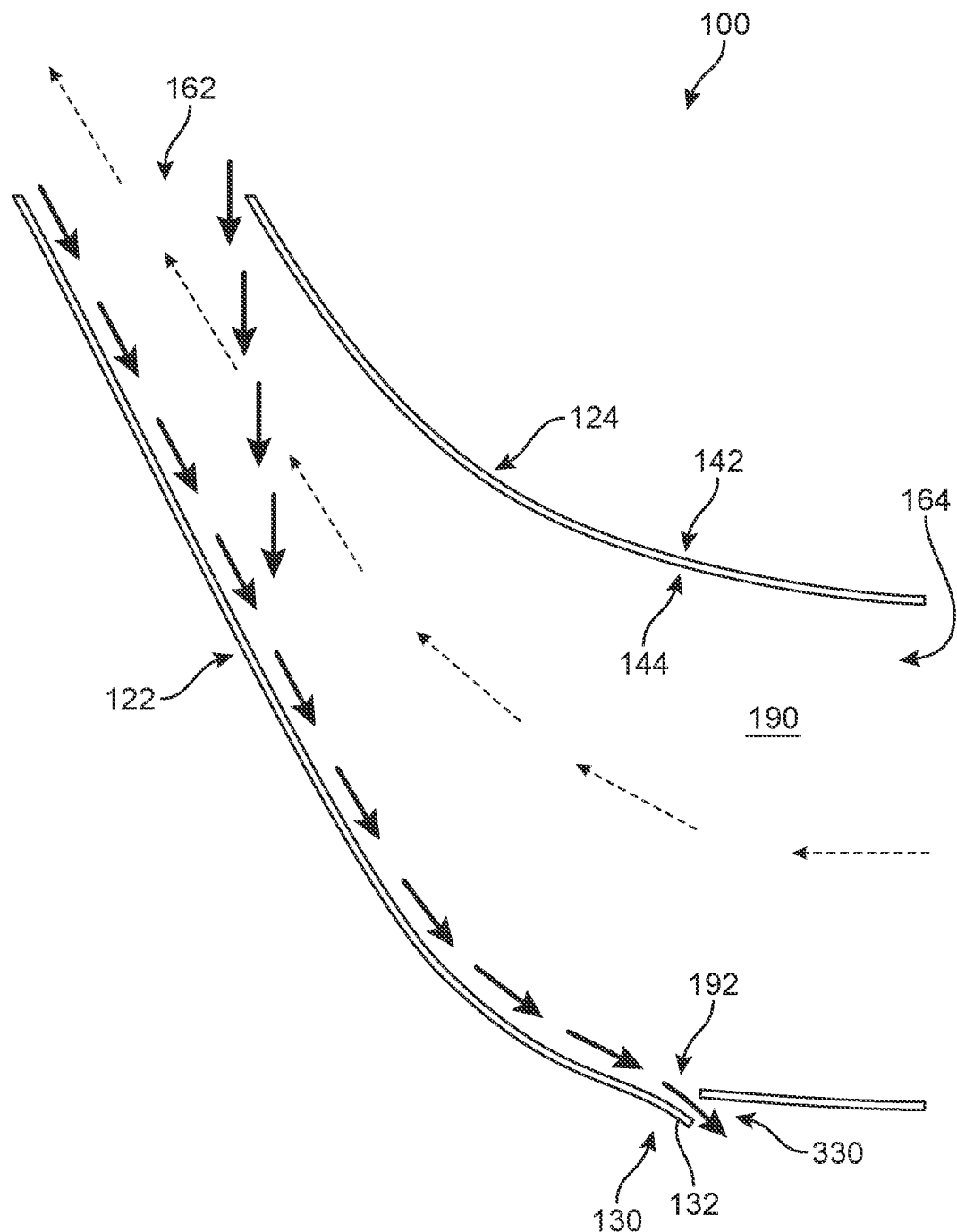
FIG. 3 is a schematic diagram of fluid management through the fluid management assembly, according to an embodiment.

As an illustration, an embodiment of the fluid management that will occur in response to the contoured channel 190 and spout 130 arrangement presented in FIGS. 1A-2B is depicted in a schematic cross-sectional diagram in FIG. 3 taken along vertical line 114 shown in FIG. 2B. Air flow is depicted by upward arrows of a thin line weight, and water flow by downward arrows of greater line weight. As the radiator (not shown here) outputs air, the air enters the channel 190 through the second opening (see FIG. 1A) and moves into a lower end 264. The air flow is directed by the curvature of the pipe in a distal direction toward an upper end 262 that will continue upward and exit through the vent (not shown). Meanwhile, when liquid such as water enters the compartment through the vent into the first opening (see FIG. 1A), rather than flowing to the other end and causing undesirable effects on components associated with the radiator, drips downward and lands on the interior surface 144 of the bottom side 122, then flows downward following the curvature of the channel 190 until reaching slot 192. The water is then guided into flume portion 132 of the spout 130 until exiting the assembly 100. Thus, the progress of the air away from the radiator and out the vent is unimpeded by the water's progress in the opposite direction, as the curvature of the channel 190 and the flume portion 132, as well as the narrow opening of the slot 192, minimize the loss or distraction of air through the slot 192.

As shown in FIG. 3, the slot 192 can be formed near or at the lowest region of the bottom side 122. In other words, water will travel down and naturally pool toward the lowest surface of the interior channel. In this region, the slot will collect the water and direct the flow onto the drainage spout 130. Furthermore, in some embodiments, the slot itself can be covered or substantially narrowed by a portion of the of the top wall of the housing, preventing water ingress to the radiator fans without distracting air flow coming out of the radiator fans. Thus, the length of the slot from a distal border (adjacent to the edge of the flume portion) to a proximal border (abutting the lower portion of the housing) can be a narrow slit. In one embodiment, the proximal border rises up as it extends in a distal direction from the lower portion. The proximal border can thereby be positioned slightly above the distal border to provide a slight curve that blocks the flow of water from proceeding further (proximally) forward while also directing the flow of air upward. As warm air rises up and out, the water will naturally move to flow at a relatively lower level, in this case, by running down the interior surface of the channel.

Figure 4A:
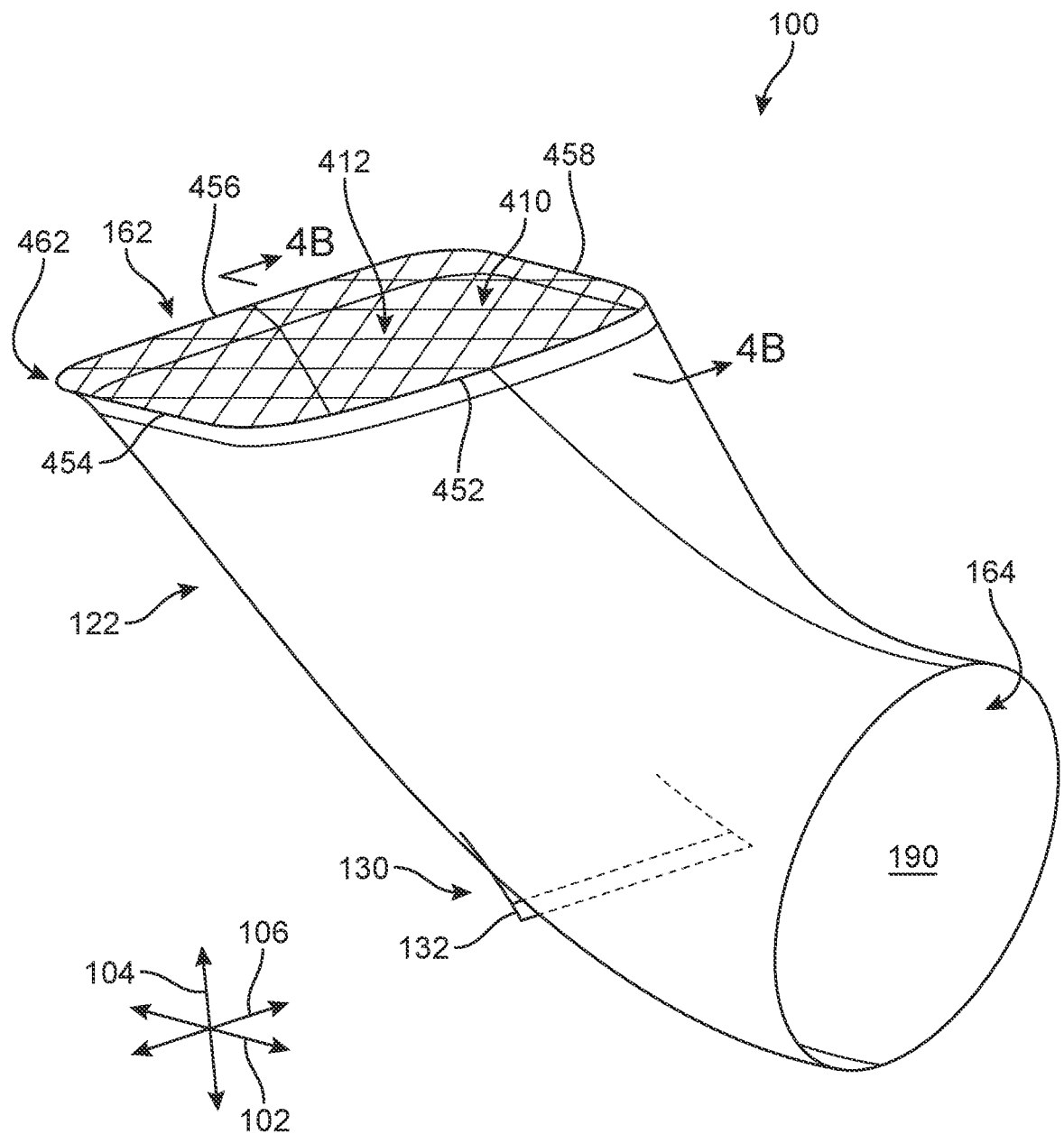
FIG. 4A is a schematic perspective view of the fluid guide duct housing further including a mesh screen across a first opening, according to an embodiment.

In different embodiments, assembly 100 can include additional provisions to facilitate water management. FIGS. 4A and 4B depict one example of a structure for reducing and/or mitigating the ingress of snow, liquids, or other debris into the assembly 100. In the first embodiment presented in FIG. 4A, a mesh array ("mesh") 410 is installed in or across a frame 462 of the first opening 162, shown here with a perimeter comprising a first side 452, a second side 454, a third side 456, and a fourth side 458. A plurality of apertures 412 formed in the mesh array 410 allows air flow to continue to exit normally, while the mesh array 410 can block some debris and reroute some of the water that splashes down on the vent. In some embodiments, the mesh array 410 is disposed in a diagonal orientation across the frame 462 (as shown in FIG. 4A), while in other embodiments the mesh array 410 can be aligned with the longitudinal axis 102 or lateral axis 106.

In some embodiments, the mesh 410 includes a plurality of holes (apertures 412) formed therethrough, which form a screen. The screen serves as an air permeable barrier across the flow path for inhibiting moisture droplets and relatively large particles from entering the channel 190 without significantly affecting the flow rate of the outcoming air. Thus, the screen should have holes that are small enough to screen out most debris, but not too small to significantly restrict airflow. For example, in one embodiment, the screen may include holes having an area not to exceed 625 square millimeters, which will prevent the ingress of most debris and permit good airflow therethrough. The moisture droplets and particles may be from water or particles splashed or thrown on the front of vehicle, as well as from moisture or particles carried by intake air. The screen therefore provides an initial deflection of these items, which can prevent the assembly 100 from being clogged.

In an alternate, second embodiment, shown as a cross-section in FIG. 4B, a grille array ("grille") 480 comprising a plurality of louvers ("louvers") 482 can be installed across the frame 462. In some embodiments, louvers extend laterally across the opening of the frame to both direct the flow of air out of the first opening 162 as well as help block debris and fluids from entering the air outlets and potentially damaging the radiator. The thickness of the frame serves to support ends of the louvers 482 extending therebetween across the opening.

In some embodiments, the louvers 482 of the present embodiment can be formed as elongated members extending laterally, longitudinally, or diagonally across the opening of the frame 462. The louvers 482 can be formed as substantially planar slats extending lengthwise across portions of the opening defined by the frame 462. In one embodiment, diagonally oriented louvers 482 in the central section of the present embodiment may have a greater length than those near the peripheral regions of the frame 462, while in other embodiments all of the louvers 482 are substantially equal in length. In some examples, louvers 482 that extend laterally across the opening defined by the frame 462 can be configured to have a non-linear cross-section. For example, the louvers 482 can have a double curve, or wave, shape in profile. The double curve shape of the louver can serve to impede eddy currents and circulation/recirculation of air flowing to the radiator to thereby increase mass flow to the radiator, enhancing radiator efficiency. Structural rigidity of the louver can also be enhanced by virtue of the double curve shape.

In different embodiments, the collection of louvers 482 serve as a grille screen that include a plurality of slatted openings. These openings allow for air to flow freely out of the channel 190 while inhibiting moisture droplets and relatively large particles from entering the channel 190 without significantly affecting the flow rate of the outcoming air. The louvers therefore provide an initial deflection of these items, which can prevent the assembly 100 from being clogged.

Figure 5:
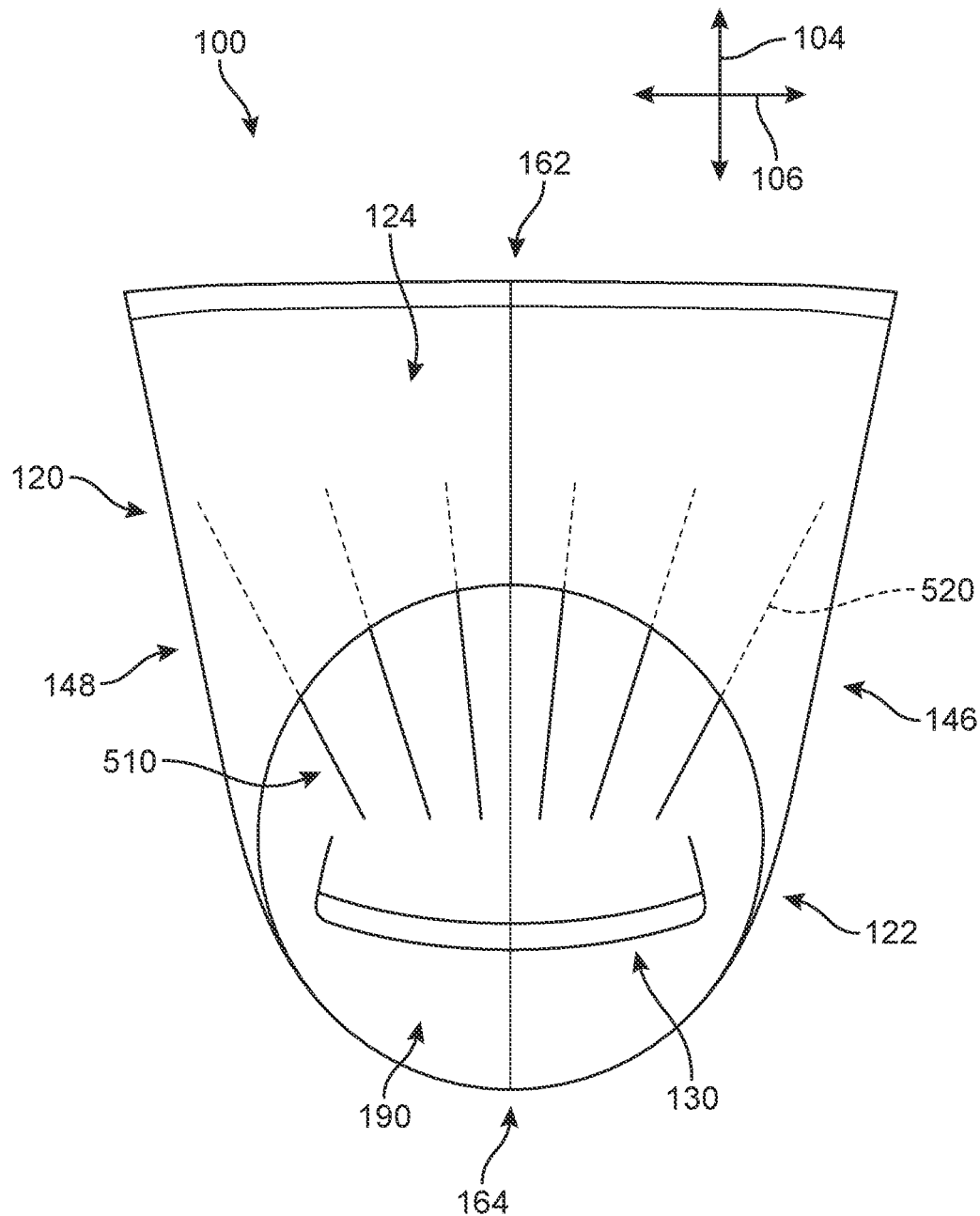
FIG. 5 is a schematic front view of the fluid guide duct housing further including a fin array in the interior channel protruding from an interior surface of the bottom side, according to an embodiment.

In yet another embodiment, shown in the front view of FIG. 5, the assembly 100 can additionally or alternatively include provisions to improve the flow of liquid such as water toward a central region of the housing 120. In this example, a fin array 510 comprising a plurality of vane panels ("vanes") 510 for guiding water flow to the spout 130 is formed in the channel 190. In some embodiments, the vanes 510 are substantially planar surfaces that extend from the bottom side 122 of the housing 120 in a proximal direction. In one example, the vanes are arranged to form a fanned shape, similar to the orientation of feathers in an open peacock tail (i.e., more diagonal-less diagonal-nearly straight-less diagonal-more diagonal). The vanes 510 may be angled to guide airflow from underneath (originating from the radiator) upwards and out. In addition, the vanes 510 are oriented relative to vertical axis to serve as a funnel that captures water flow from above and direct the water toward the centrally disposed spout 130. In some embodiments, the vanes may not be entirely planar, but may include some curvature to follow contours of the interior surface of the channel 190, while in other embodiments, the vanes may not follow the curvature of the interior surface. The use of vanes 510 can cause the flow of water to pool more rapidly and efficiently toward a central region in the bottom of the interior surface of the tubular structure. In such cases, the lateral width of the slot can be reduced as water is funneled more directly to the slot. In further embodiments, the vanes may be substantially perpendicular to the flow of air to create a desired airflow effect, such as vortex generation, while still guiding the water towards the spout 130. In such cases, the vanes may be vertically oriented or angled towards a rear of the vehicle so as to not disturb air flow entering the duct from the front of the vehicle, while still causing water to pool at a rearward surface of the vane and flow towards the spout 130.

Figure 6A:
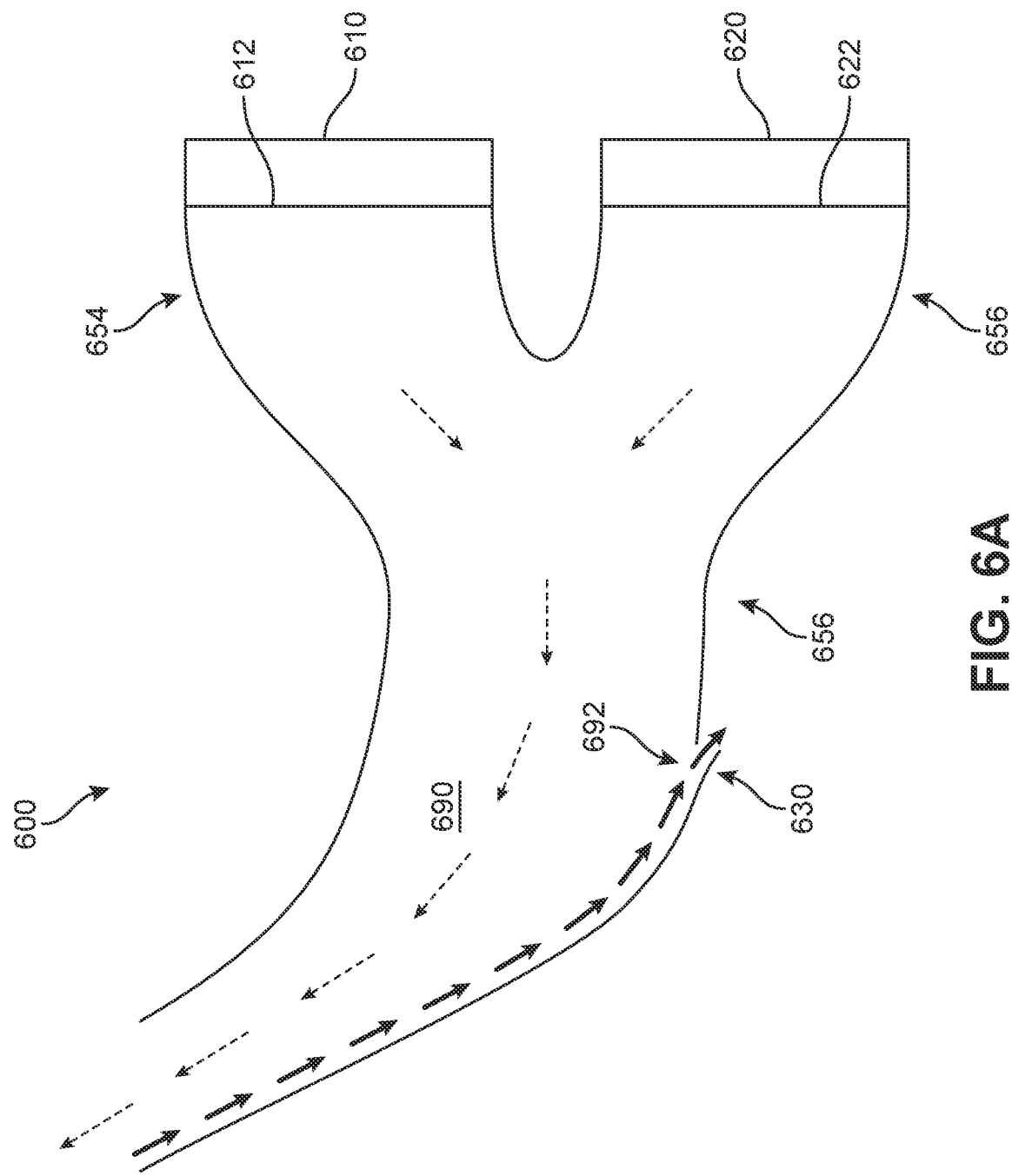
FIGS. 6A and 6B depict two non-limiting, alternate examples of fluid management assemblies for implementation with multiple ducts, according to an embodiment.
Figure 6B:
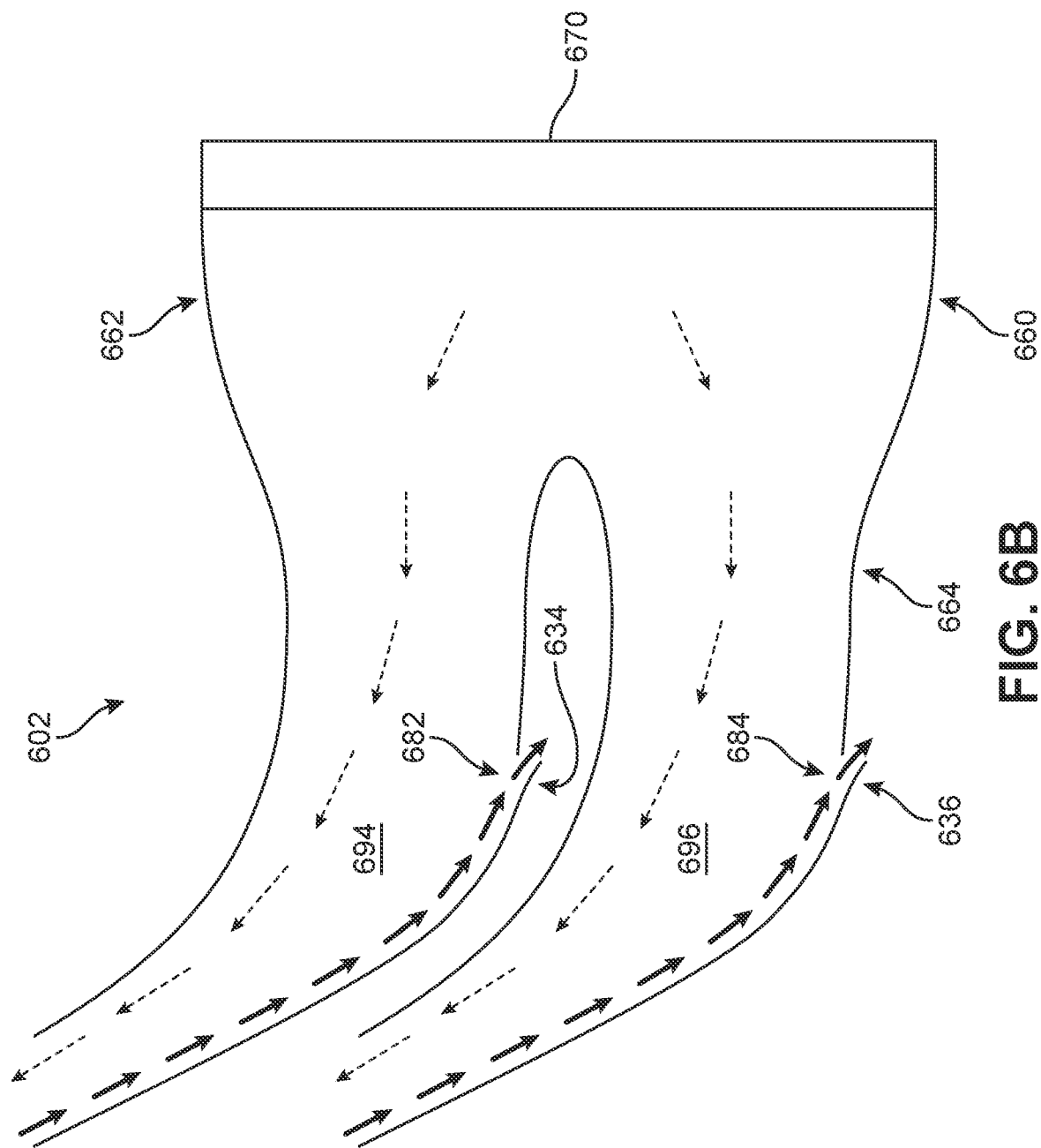

It can be appreciated that in different embodiments the proposed systems and methods can be used to manage the flow of fluids in assemblies that include more than one duct. Two examples are depicted in FIGS. 6A and 6B. In the example of FIG. 6A, a first assembly 600 includes a first radiator fan 610 that passes air through a first proximal opening 612 in fluid communication with a first duct 654, as well as a second radiator fan 620 passes air through a second proximal opening 622 in fluid communication with a second duct 656. Both ducts in this case merge into a single distal duct 650. In this case, air flow can travel through a first channel 690 formed by the merged ducts and out through the vent, as described above. In addition, a first spout 630 is shown protruding from a bottom side of the first assembly 600, configured to provide an outlet for incoming water via a first slot 692 formed in the distal duct 650.

In the example of FIG. 6B, a second assembly 602 includes a single radiator 670 that feeds into a single proximal opening 660. However, the airflow is then shuttled via two separate ducts to the vent(s) in the hood above. In this case, a first distal duct 662 and a second distal duct 664 carry air away from the radiator 670. Water or other debris entering through the vent(s) into a second channel 694 for first distal duct 662 and a third channel 696 for second distal duct 664 can then be routed through respective outlets. For example, a second spout 634 extends downward from the first distal duct 662 from which water flows through a second slot 682, and a third spout 636 downward from the second distal duct 664 from which water flows through a third slot 684.

As disclosed herein, embodiments of a fluid management system for a vehicle include a fluid guide duct that further includes an elongated housing extending from a first end to a second end, an interior channel extending from a first opening at the first end to a second opening at the second end, the first opening being in fluid communication with a vent formed in a hood of the vehicle, and the second opening being disposed lower than the first opening, and a drainage spout extending from a slot formed in a bottom side of the housing, the drainage spout including a flume portion serving as a conduit for directing fluid flow in a diagonally downward direction from the interior channel. In some embodiments, the fluid guide duct includes an upper portion and a lower portion, where the slot is formed in a region of the upper portion that directly abuts the lower portion, and the flume portion protrudes from the bottom side of the housing adjacent to a proximal side of the slot. In one embodiment, the fluid guide duct has a substantially curved L-shaped housing.

In some embodiments, the housing includes the bottom side and an opposite-facing a top side, as well as a first side and an opposite-facing second side, and the slot is disposed centrally relative to the first side and the second side. In another embodiment, the upper portion of the interior channel extends in a substantially diagonal direction relative to a vertical axis of the fluid guide duct and the lower portion of the interior channel is substantially aligned with a horizontal axis of the fluid guide duct. In different embodiments, a slot length of the slot extends longitudinally from a distal border of the slot that is nearer to the first end to a proximal side of the slot that is nearer to the second end, and a spout length of the drainage spout extends from the distal border to an outermost edge of the flume portion, and is similar to or greater than the slot length. In some cases, the housing comprises a substantially continuous pipe structure but for the slot formed in the lower portion. In one example, the second opening is in fluid communication with a portion of a cooling system component of the vehicle. In another example, the upper portion further includes a tubular section in which the slot is formed, and the tubular section has a substantially circular cross-sectional shape relative to a lateral axis, and a first lateral edge of the flume portion corresponds to a centrally disposed/formed arc of the circular cross-sectional shape, the arc being 90 degrees or less.

In different embodiments, the first opening is bounded by a frame, and the system further includes a mesh screen extending across the frame. In some embodiments, the first opening is bounded by a frame, and the system further includes a plurality of louvers extending across the frame. In another embodiment, the upper portion further comprises a fin array including a plurality of vanes protruding in a proximal direction from an interior surface of the bottom side.

As another example, embodiments of a fluid management assembly for a motor vehicle having a hood and cooling system component are disclosed herein. In some embodiments, the fluid guide assembly includes a pipe housing including a first opening in fluid communication with a vent formed in the hood and a second opening in fluid communication with the cooling system component, and a drainage spout protruding from a bottom side of the housing. In some embodiments, the fluid management assembly further includes a slot formed in the bottom side of the housing directly above the drainage spout. In another example, the fluid management assembly also includes at least a first louver extending across the first opening. In yet another example, the fluid management assembly further includes mesh screen extending across the first opening. In some embodiments, the fluid management assembly of also includes a plurality of vanes protruding from an interior surface of the housing along the bottom side.

In still another example, embodiments of a method for guiding fluid flow through a front end compartment of a motor vehicle via a fluid guide duct including a first opening and a second opening are disclosed herein. In some embodiments, the method includes steps of discharging air flow from a cooling system component into the second opening of the fluid guide duct, directing the air flow from the second opening to the first opening of the fluid guide duct, the first opening being in fluid communication with a vent formed in a hood of the motor vehicle, receiving water flow from the vent into the first opening of the fluid guide duct, directing the water flow along an interior surface of a bottom side of the fluid guide duct, and discharging the water flow through a slot formed in the bottom surface of the fluid guide duct. In one embodiment, the method further includes a step of directing the water flow down a drainage spout protruding from the bottom side of the fluid guide duct as it exits the slot. In another embodiment, the method also includes funneling the water flow entering from the vent toward a central region by passing the water through a plurality of vanes protruding from the interior surface of the bottom side. In another example, the method also includes filtering debris from entering the vent through a mesh screen extending across the first opening.

The foregoing disclosure of the preferred embodiments has been presented for purposes of illustration and description. It is not intended to be exhaustive or to limit the embodiments to the precise forms disclosed. Many variations and modifications of the embodiments described herein will be apparent to one of ordinary skill in the art in light of the above disclosure.

While various embodiments have been described, the description is intended to be exemplary, rather than limiting, and it will be apparent to those of ordinary skill in the art that many more embodiments and implementations are possible that are within the scope of the embodiments. Any feature of any embodiment may be used in combination with or substituted for any other feature or element in any other embodiment unless specifically restricted. Accordingly, the embodiments are not to be restricted except in light of the attached claims and their equivalents. Also, various modifications and changes may be made within the scope of the attached claims.

Further, in describing representative embodiments, the specification may have presented a method and/or process as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process should not be limited to the performance of their steps in the order written, and one skilled in the art can readily appreciate that the sequences may be varied and still remain within the spirit and scope of the present embodiments.

The invention claimed is:

1. A fluid management system for a vehicle, the system comprising:
   a fluid guide duct including:
      an elongated housing extending from a first end to a second end,
      an interior channel extending from a first opening at the first end to a second opening at the second end, the first opening being in fluid communication with a vent formed in a hood of the vehicle, and the second opening being disposed lower than the first opening, wherein the second opening is in fluid communication with a portion of a cooling system component of the vehicle; and
   a drainage spout extending from a slot formed in a bottom side of the housing, the drainage spout including a flume portion serving as a conduit for directing fluid flow in a diagonally downward direction from the interior channel.

2. The system of claim 1, wherein:
   the fluid guide duct includes an upper portion and a lower portion,
   the slot is formed in a region of the upper portion that directly abuts the lower portion, and
   the flume portion protrudes from the bottom side of the housing adjacent to a proximal side of the slot.

3. The system of claim 2, wherein:
   the housing includes the bottom side and an opposite-facing a top side, and a first side and an opposite-facing second side, and
   the slot is disposed centrally relative to the first side and the second side.

4. The system of claim 2, wherein the upper portion of the interior channel extends in a substantially diagonal direction relative to a vertical axis of the fluid guide and the lower portion of the interior channel is substantially aligned with a horizontal axis of the fluid guide duct.

5. The system of claim 2, wherein:
- a slot length of the slot extends longitudinally from a distal border of the slot that is nearer to the first end to a proximal side of the slot that is nearer to the second end; and
- a spout length of the drainage spout extends from the distal border to an outermost edge of the flume portion, and is similar to or greater than the slot length.

6. The system of claim 1, wherein the housing comprises a substantially continuous pipe structure but for the slot formed in the lower portion.

7. The system of claim 1, further comprising an additional, second fluid guide duct that merges with the first channel of the fluid guide duct such that air flow from both the fluid guide duct and the second fluid guide duct travels through the first channel and exits from the vent.

8. The system of claim 2, wherein:
- the upper portion further includes a tubular section in which the slot is formed, and
- the tubular section has a substantially circular cross-sectional shape relative to a lateral axis, and a first lateral edge of the flume portion corresponds to a centrally disposed arc of the circular cross-sectional shape, the arc being 90 degrees or less.

9. The system of claim 1, wherein the first opening is bounded by a frame, and the system further includes a mesh screen extending across the frame.

10. The system of claim 1, wherein the first opening is bounded by a frame, and the system further includes a plurality of louvers extending across the frame.

11. The system of claim 2, the upper portion further comprising a fin array including a plurality of vanes protruding in a proximal direction from an interior surface of the bottom side.

12. A fluid management assembly for a motor vehicle having a hood and cooling system component, the fluid guide assembly comprising:
- a pipe housing including a first opening in fluid communication with a vent formed in the hood and a second opening in fluid communication with the cooling system component; and
- a drainage spout protruding from a bottom side of the housing.

13. The fluid management assembly of claim 12, further comprising a slot formed in the bottom side of the housing directly above the drainage spout.

14. The fluid management assembly of claim 12, further comprising at least a first louver extending across the first opening.

15. The fluid management assembly of claim 12, further comprising a mesh screen extending across the first opening.

16. The fluid management assembly of claim 12, further comprising a plurality of vanes protruding from an interior surface of the housing along the bottom side.

17. A method for guiding fluid flow through a front end compartment of a motor vehicle via a fluid guide duct including a first opening and a second opening, the method comprising:
- discharging air flow from a cooling system component into the second opening of the fluid guide duct;
- directing the air flow from the second opening to the first opening of the fluid guide duct, the first opening being in fluid communication with a vent formed in a hood of the motor vehicle;
- receiving water flow from the vent into the first opening of the fluid guide duct;
- directing the water flow along an interior surface of a bottom side of the fluid guide duct; and
- discharging the water flow through a slot formed in the bottom surface of the fluid guide duct.

18. The method of claim 17, further comprising directing the water flow down a drainage spout protruding from the bottom side of the fluid guide duct as it exits the slot.

19. The method of claim 17, further comprising funneling the water flow entering from the vent toward a central region by passing the water through a plurality of vanes protruding from the interior surface of the bottom side.

20. The method of claim 17, further comprising filtering debris from entering the vent through a mesh screen extending across the first opening.

* * * * *